United States Patent
Pan

(10) Patent No.: US 8,299,412 B2
(45) Date of Patent: Oct. 30, 2012

(54) INTELLIGENT SOLAR PANEL ARRAY

(76) Inventor: Yang Pan, Shanghai (CN)

( * ) Notice: Subject to any disclaimer, the term of this patent is extended or adjusted under 35 U.S.C. 154(b) by 578 days.

(21) Appl. No.: 12/563,130

(22) Filed: Sep. 19, 2009

(65) Prior Publication Data

US 2011/0067743 A1    Mar. 24, 2011

(51) Int. Cl.
*H01L 31/042* (2006.01)

(52) U.S. Cl. .................... 250/203.4; 136/244

(58) Field of Classification Search ............... 250/203.4; 136/244–246
See application file for complete search history.

(56) References Cited

U.S. PATENT DOCUMENTS

| | | | |
|---|---|---|---|
| 4,031,385 A | 6/1977 | Zerlaut et al. | |
| 4,223,214 A | 9/1980 | Dorian et al. | |
| 4,297,572 A | 10/1981 | Carlton | |
| 4,445,030 A | 4/1984 | Carlton | |
| 4,794,909 A | 1/1989 | Eiden | |
| 5,929,530 A * | 7/1999 | Stone | 290/2 |
| 6,123,067 A * | 9/2000 | Warrick | 126/593 |
| 6,239,353 B1 | 5/2001 | Hall et al. | |
| 6,284,968 B1 | 9/2001 | Niesyn | |
| 6,552,257 B1 | 4/2003 | Hart et al. | |
| 6,680,693 B2 * | 1/2004 | Urban et al. | 342/357.64 |
| 6,960,717 B2 | 11/2005 | Stuart et al. | |
| 7,055,219 B2 * | 6/2006 | Shiba | 16/367 |
| 7,105,940 B2 | 9/2006 | Weesner et al. | |
| 7,281,381 B2 * | 10/2007 | Johnson | 60/641.15 |
| 2003/0172922 A1 | 9/2003 | Haber | |
| 2006/0162772 A1 | 7/2006 | Presher, Jr. et al. | |
| 2006/0225729 A1 * | 10/2006 | Litwin | 126/573 |
| 2007/0103108 A1 | 5/2007 | Capp et al. | |
| 2008/0011288 A1 | 1/2008 | Olsson | |
| 2008/0087321 A1 | 4/2008 | Schwartzman | |
| 2009/0188488 A1 | 7/2009 | Kraft et al. | |

* cited by examiner

*Primary Examiner* — Seung C Sohn

(57) ABSTRACT

An intelligent solar panel array is disclosed. The array comprises a master panel and a plurality of client panels connected by a predetermined scheme. All panels further comprise a plurality of solar energy collection modules, a supporting, pivoting and tilting mechanism, a controller and a short range communication unit. The communication units of panels form an ad hoc communication network. The master panel further comprises another communication unit for communicating with a server through an existing communication network such as the Internet. At a moment of operation, the optimized position of the master panel towards the sun is determined by measuring current-voltage curve at multiple positions. The optimized position is transmitted to all client panels through the ad hoc communication network. All panels therefore generate electrical power based upon the optimized positions towards the sun.

9 Claims, 7 Drawing Sheets

INTELLIGENT SOLAR PANEL ARRAY

CROSS-REFERENCE TO RELATED APPLICATIONS

Not applicable.

BACKGROUND

1. Field of Invention

This invention relates to solar energy collection, specifically to a system and method of maximizing solar energy collection from a solar panel array.

2. Description of Prior Art

In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing. It has become increasing common to seek for alternative energy sources. One such energy source is the sun. Solar panels have been available for many years for the purpose of converting the energy from sunlight into electricity. The collected energy is thereafter often stored in some sort of energy bank and used for heating homes, water suppliers, and powering various electrical devices. The collected energy in a form of DC (Direct Current) electricity may also be injected into a power grid after it is converted into AC (Alternative Current) electricity by an inverter.

In order for the solar panel to receive as much solar energy as possible for conversion into electricity, it is desirable to mount the solar panel on an adjustable support apparatus that allows for variably orienting the solar panel relative to the general position of the sun. Many existing devices generally provide for tilting and rotation of the panel. Tilting of the panel is generally provided by a pivotal connection at the bottom of the panel and a drive mechanism of some sort, with the panel bottom either directly hinged to a base of some sort or hingedly connected to a rigid non-extendable linkage. Several of these devices also provide for rotation of the panel. The rotation is usually provided by separately rotating the support apparatus such as a pole or a plate for the entire panel.

As the sun moves across the sky from sunrise to sunset, it is desirable that the orientation of the solar panel is changed accordingly by the pivoting and tilting mechanism of the support apparatus to maintain an optimized position for generating highest electricity from the sunlight.

A clock mechanism has been employed to control the orientation of the panel. To compensate for the compound movement of the sun, daily from horizon to horizon, and seasonally with a progressing season elevation, the clock mechanism must be elaborate and therefore expensive.

Sensors such as illumination detectors have also been employed to derive the position of the sun. U.S. Pat. No. 4,297,572 to Carlton disclosed a solar energy collector assembly including a solar panel mounted for movement along a predetermined tracking path in order to maintain a predetermined orientation with respect to the sun. The disclosed assembly also includes a specific solar tracking sensor. There are many problems associated with the use of illumination detectors in the tracking mechanism including shadowing of the detector by a cloud in the sky.

A solar panel array comprising a multiple solar panels connected together in series and/or in parallel has recently become more and more popular, in particularly, for use as a power generation plant. It is important that the array generates highest possible electrical power to speed up the return on investment (ROI). Low cost wireless communication network has been proposed to enhance the operation efficiency of the array.

In US patent publication 2008/0087321 by Schwartzman, a solar energy generator module is disclosed including a modular photovoltaic array, sensors, controller and communication means for monitoring and communicating a variety of physical parameters from each module to a centralized computer. The collected information can be utilized to monitor module health for maintenance purposes, and also be used as a position input for the primary servomechanism control algorithm.

In US patent publication 2009/0188488 by Kraft et al., an apparatus for networking solar tracking devices is disclosed. The system includes one or more solar tracking devices, each comprising a tracking controller. Tracking controllers form a wireless mesh communication network managed by a network manager. Tracking controller receives operation data from and sends monitor data to host computer.

The potential to increase the efficiency of the solar array by employing a low cost communication network connectable to the Internet, however, has not yet been fully explored. It is desirable to have an intelligent solar panel array which can maximize the generated electricity with acceptable cost.

SUMMARY OF THE INVENTION

It is therefore an object of the present invention to provide a novel solar panel array for generating highest electrical power from the sunlight without employing a dedicated illumination detector.

It is another object of the present invention to provide a novel system and method for maximizing generated electricity of a solar panel array by employing an ad hoc communication network comprising communication devices embedded in each solar panel.

A solar panel comprises a plurality of solar modules installed on an apparatus with a supporting, pivoting and tilting mechanism, a controller, and a communication device. The optimized orientation (position) for the panel is determined by pivoting and/or the panel to multiple positions in a sequential manner. At each position, the generated DC current and voltage is measured by a measurement unit. The maximum power point is then determined based upon the measured current-voltage curve. The optimized position for generating the highest electrical power is decided by comparing all recorded maximum power at each position. Since it is a direct measurement on the generated current and voltage from the solar panel, no dedicated illumination detector is required.

A solar panel array is formed by a number of solar panels connected in a predetermined scheme. One of the panels is a master panel and the rest of the panels are client panels. Communication devices from the panels form an ad hoc communication network. The master panel may have another communication means for connecting directly to a server (host computer) through an existing communication network such as the Internet. The optimized position determined by the master panel may be sent to client panels through the communication network. All panels are adjusted to the optimized position for generating the highest electrical power. The described method may be repeated in a predetermined frequency during the daytime.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
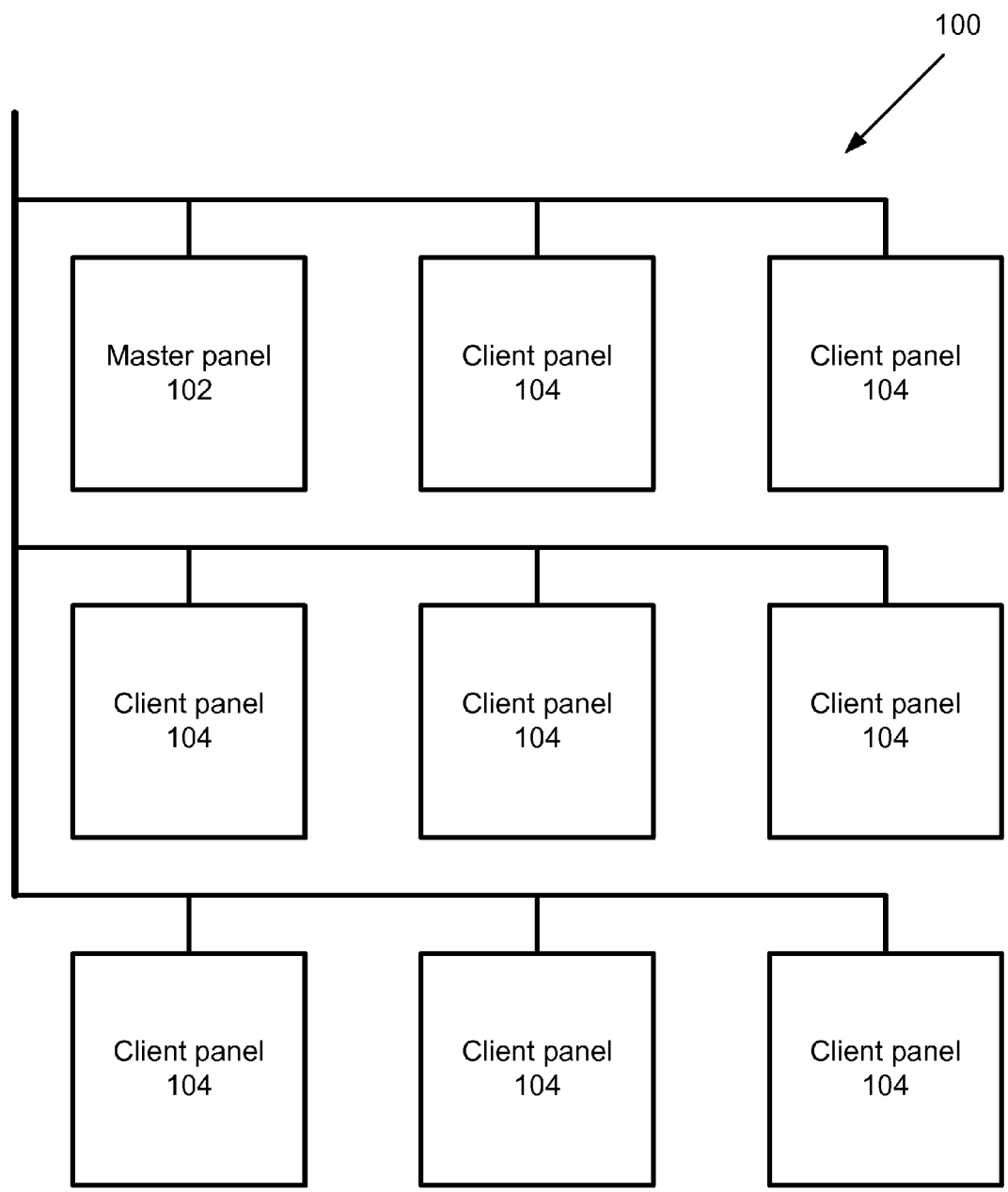
FIG. 1 is a schematic diagram of a solar panel array with a master panel and multiple client panels.

FIG. 1 is a schematic diagram of a solar panel array 100. The array 100 comprises a mater panel 102 and a plurality of client panels 104. Although the panels are connected in a parallel manner as illustrated in an exemplary case, the panels can be connected in any configuration in a combination of in series and/or in parallel to generate a desired DC current and voltage. The generated DC electricity may be converted into AC electricity by an inverter and is subsequently injected into a power grid. The generated DC electricity may also be used directly to power electrical devices or appliances. The generated DC power may also be stored in a storage device such as a battery.

Figure 2:
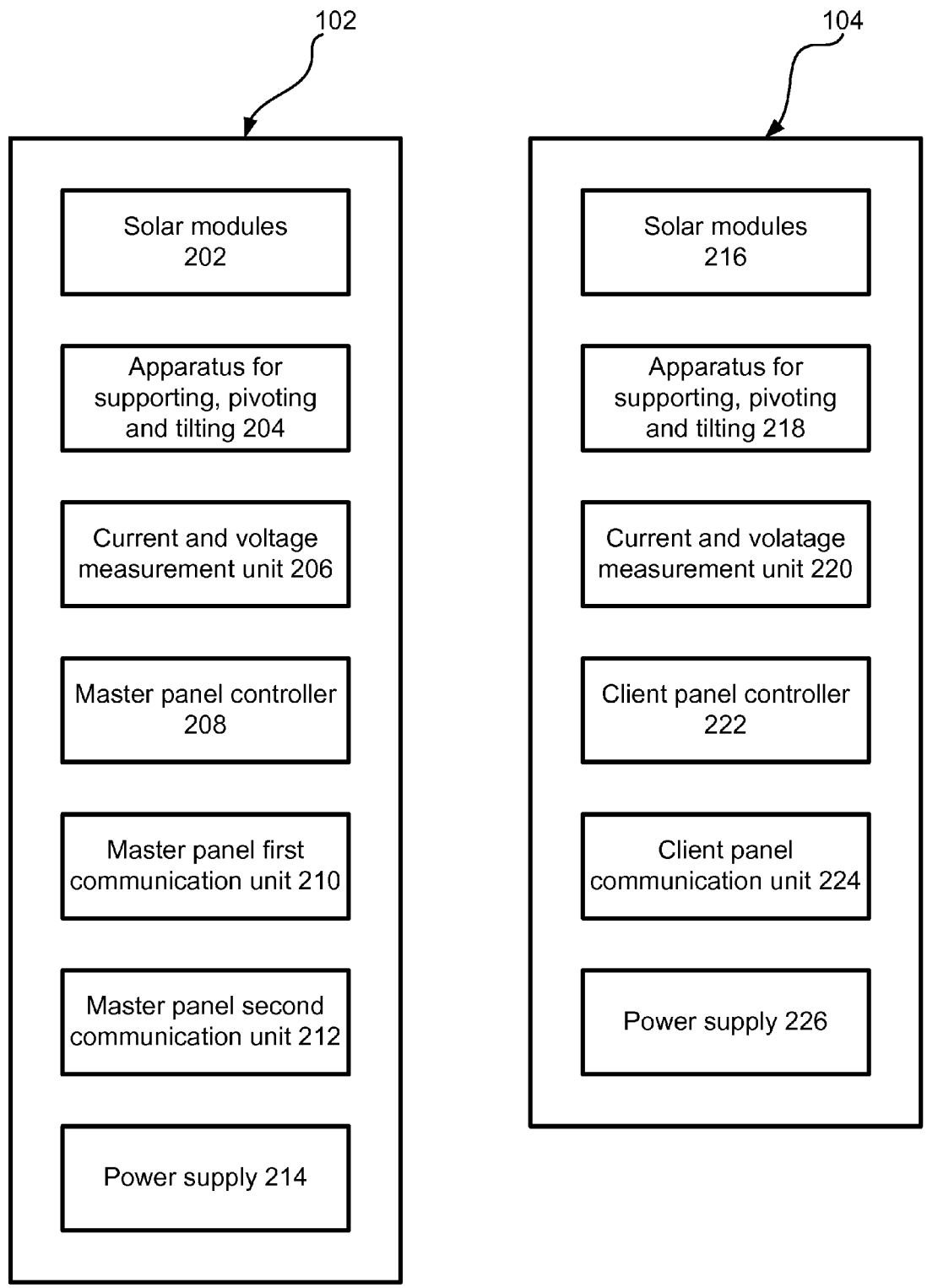
FIG. 2 is a functional block diagram of an exemplary master panel and an exemplary client panel.

FIG. 2 is a functional block diagram of the master panel 102 and a client panel 104. The master panel 102 comprises a plurality of solar modules 202 connected in a predetermined manner in series and/or in parallel. Each module may further comprise a plurality of solar cells connected in series and/or in parallel. Solar modules 202 are installed on an apparatus 204 that provides a structural support for 202 and also provides a mechanism for pivoting and/or tilting the panel with a drive mechanism. A measurement unit 206 provides a means for measuring the output current and voltage of the panel. 206 may also provide a means for measuring the output current and voltage of one or several modules of the panel 102. The operation of the master panel 102 is controlled by a controller 208. The panel 102 further comprises a first communication unit 210 for communicating with client panels in the array. According to one embodiment, 210 is a short range communication device that may conform to a variety of short range communication standard such as Bluetooth (IEEE 802.11b and its amendments), Zigbee (IEEE 802.15.4 and its amendments) and WiFi (IEEE 802.11 and its amendments). The panel 102 further comprises a second communication unit 212 for communicating with a server (host computer) through an existing communication network such as the Internet. 210/212 may be separate units. 210/212 may also be an integrated unit. 210/212 may be an integrated part of 208. The operation of the panel may be powered by a power supply 214. In one aspect of the present invention, 214 may be a battery. The battery may be rechargeable by the solar panel. In another aspect, the power supply 214 may be the solar modules 202 or at least a portion of 202.

The client panel 104 comprises solar modules 216, an apparatus 218 for supporting, pivoting and/or tilting the panel, a current and voltage measurement unit 220, a controller 222, and a power supply 226. The client panel 104 comprises a communication unit 224 conforming to the same communication standard (s) as the first communication unit 210 of the master panel 102. The client panel 104 may not have a communication unit for communicating with the server directly. It is, however, possible for the client panel 104 to communicate to the server through the first and the second communication units 210/212 of the master panel 102. In an exemplary illustration of the communication path, a data file including the operational status of the client panel 104 is sent to 210 from 224. The received file is then sent to the second communication unit 212 through a cache or a memory in the controller 208 and is subsequently sent to the server by the 212. In a similar manner, an instruction from the server can be delivered to the client panel through 212 to 210 and subsequently to 224 and be received by 222 for the execution.

Figure 3:
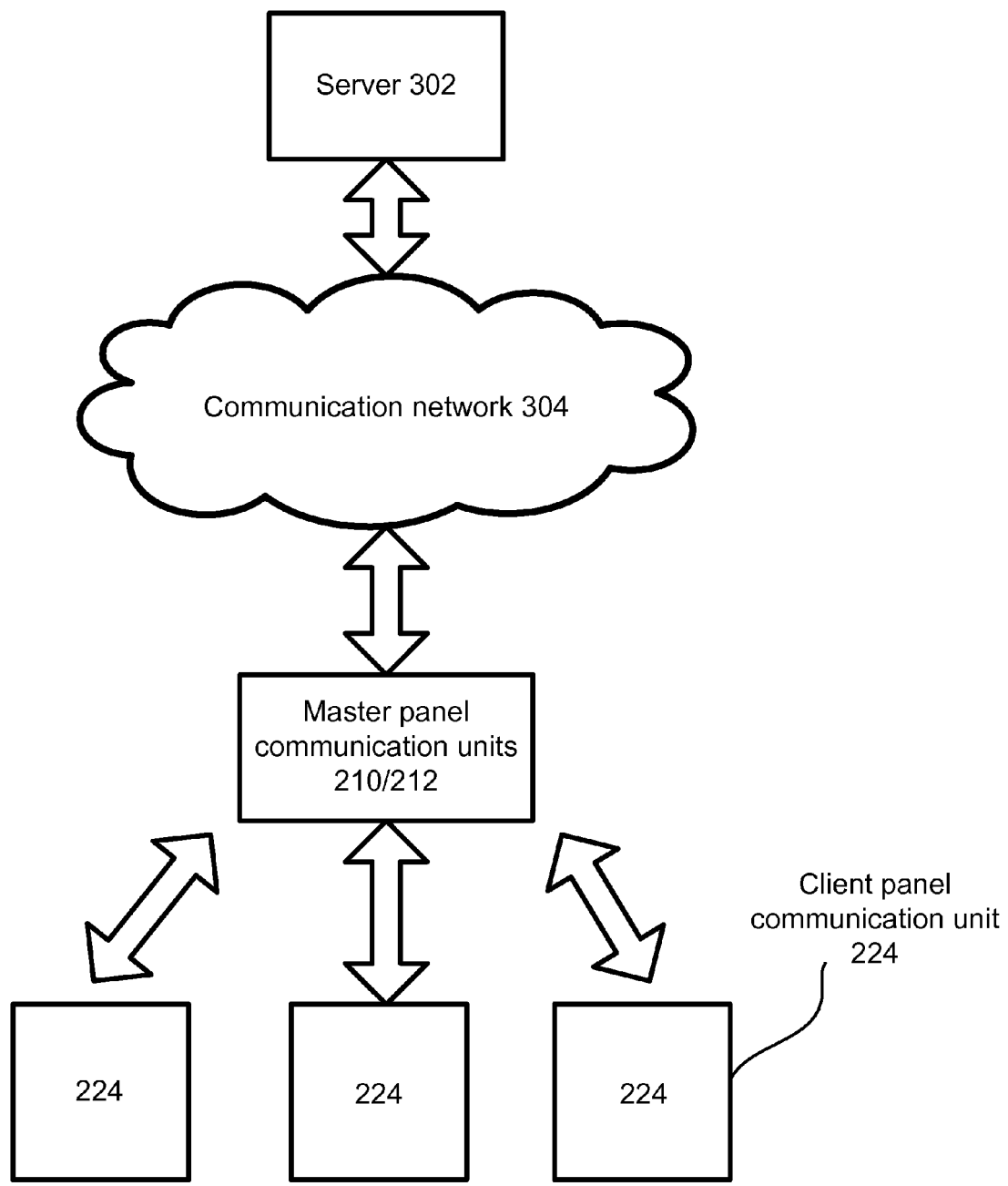
FIG. 3 is a schematic diagram of an exemplary communication module of the solar panel array with the mater panel communicating to each client panel in a parallel manner.

FIG. 3 is a schematic diagram of an exemplary communication module of the solar panel array 100 with the mater panel 102 communicating to each client panel 104 in a parallel manner. According to one embodiment of the communication module, the first communication unit 210 of the master panel 102 communicates to each communication unit 224 of client panel 104 directly. The information such as the optimized position for generating highest electrical power at a particular time of the day can be transmitted to each client panel through 210 and 224. On the other hand, the operation status of each client panel 104 can be collected and transmitted to the master panel 102 through 224/210. The communication paths are bi-directional. The master panel 102 may be connected by the use of the second communication unit 212 to a server 302 through an existing communication network 304. The network 304 may be the Internet. The network 304 may also be a private communication network.

There are numerous derivative implementations of present inventive concept. All such derivatives are fall into the spirit of the present inventive concept. In an exemplary case, a server 302 may be connected to the first communication unit 210 of the master panel 102 directly and to other communication unit 224 through 210 and be a part of the ad hoc communication network. The server 302 can then be connected to any of other servers in the Internet or to any of other communication networks. In another exemplary case, the server may be connected to communication units 210 and 224 directly and be part of the ad hoc communication network.

Figure 4:
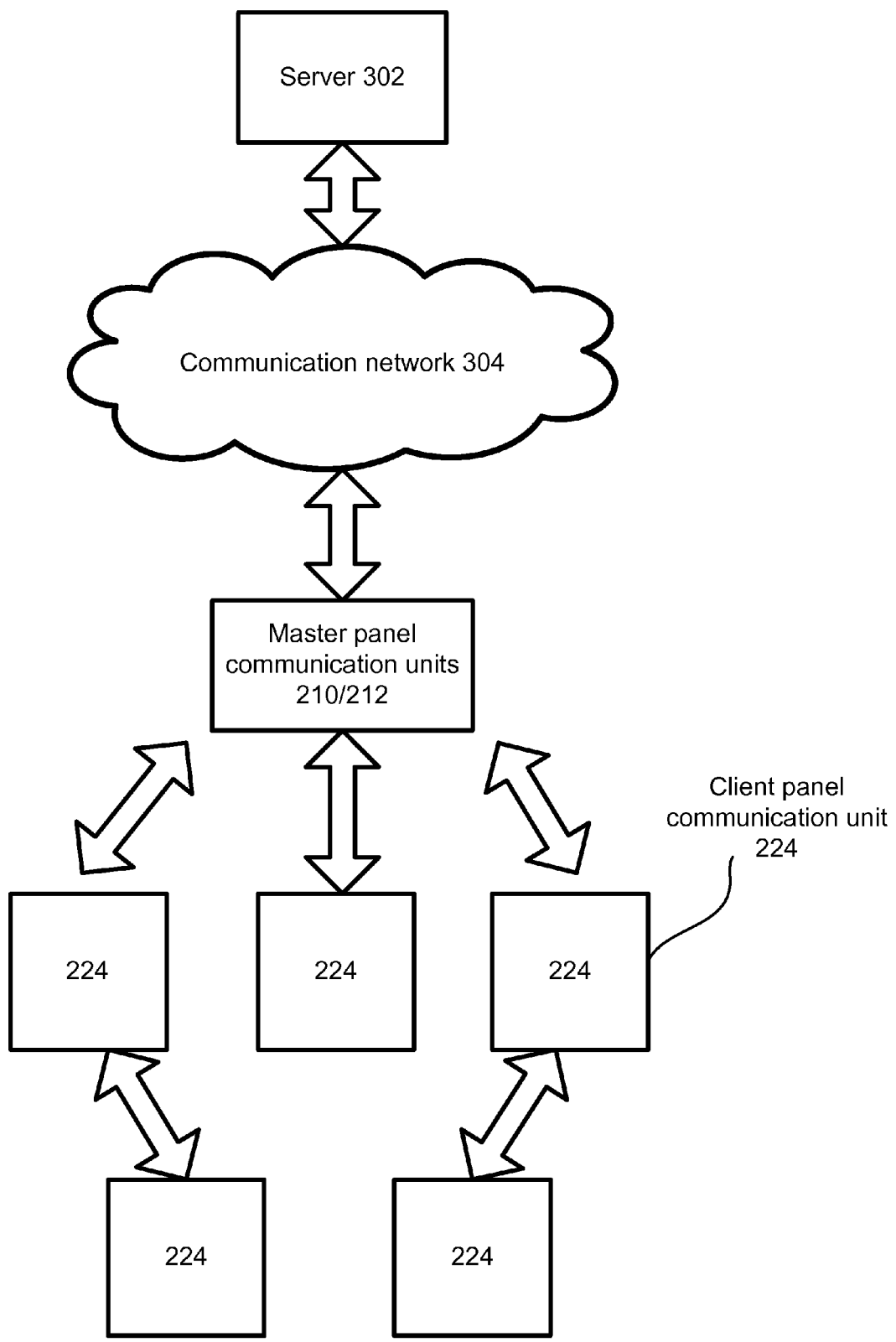
FIG. 4 is a schematic diagram of another exemplary communication module of the solar panel array with a means of master panel communicating to a client panel through yet another client panel.

FIG. 4 is a schematic diagram of another exemplary case of the communication module of the solar panel array 100. Some of the client panel communication units 224 may communicate to the communication unit 210 directly. Some of other communication units 224 may communicate to 210 through one or several communication unit 224 as is typical for an ad hoc communication network.

Figure 5:
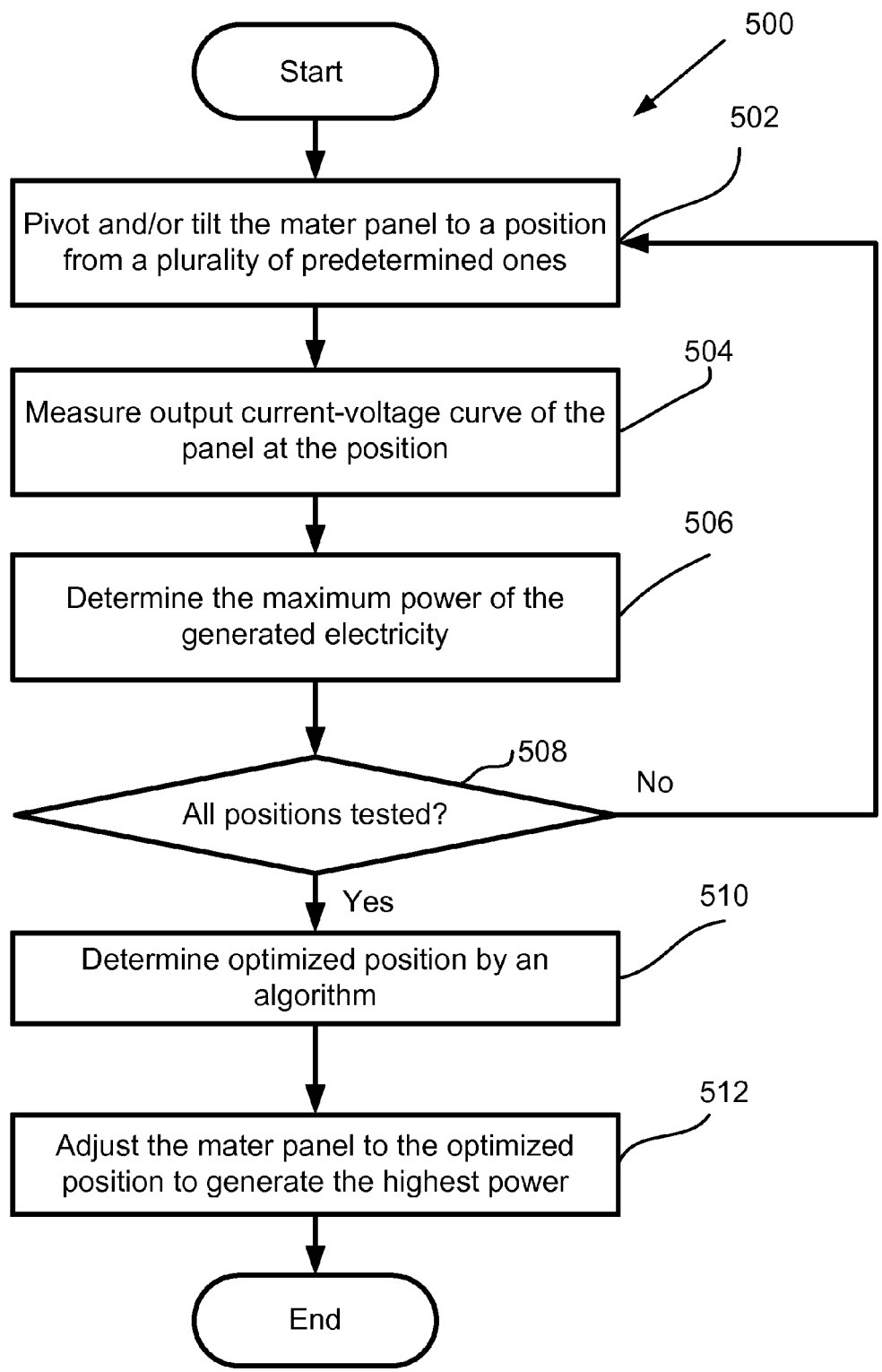
FIG. 5 is a flow diagram depicting steps of operations of determining an optimized position for a panel by measuring current-voltage curve at multiple positions.

FIG. 5 is a flow diagram depicting steps of operations of determining an optimized position for a panel by measuring current-voltage curve at multiple positions. The positions may be predetermined and are stored in the controller 208 of the master panel 102. The positions may also be determined in a real time base by the controller 208. Process 500 starts with step 502 that the panel 102 is moved to a predetermined position by pivoting and/or tilting the panel through a drive mechanism. Current and voltage relationship is then measured by the measurement unit 206 within a preset operation range and may be recorded in a memory of the controller 208 according to step 504. The maximum power point for the position is determined and recorded in step 506. Steps 502 to 506 are repeated until all predetermined positions are tested. If it is verified in step 508 that all predetermined positions have been tested, the optimized position for generating the highest electrical power is subsequently determined based on a predetermined algorithm in step 510. According to one aspect of the present invention, the optimized position may be determined by comparing each maximum power for each position and by selecting the position corresponding to the highest maximum power. According to another aspect of the present invention, the optimized position may also be determined by a more elaborate algorithm by plotting the maximum power at each position against their coordinates. The optimized position for determining the highest electrical power can then be extrapolated based upon an algorithm for finding the peak value of the plot. The method is well know in the art and can be implemented by a computing program and be executed by the controller 208. In another implementation, the collected data may be sent to the server 302 through 304. The optimized position may be determined by the server 302 and be sent back to the master panel 102. After determination of the optimized position, the panel 102 is adjusted to the position to generate the highest electrical power in step 512.

Figure 6:
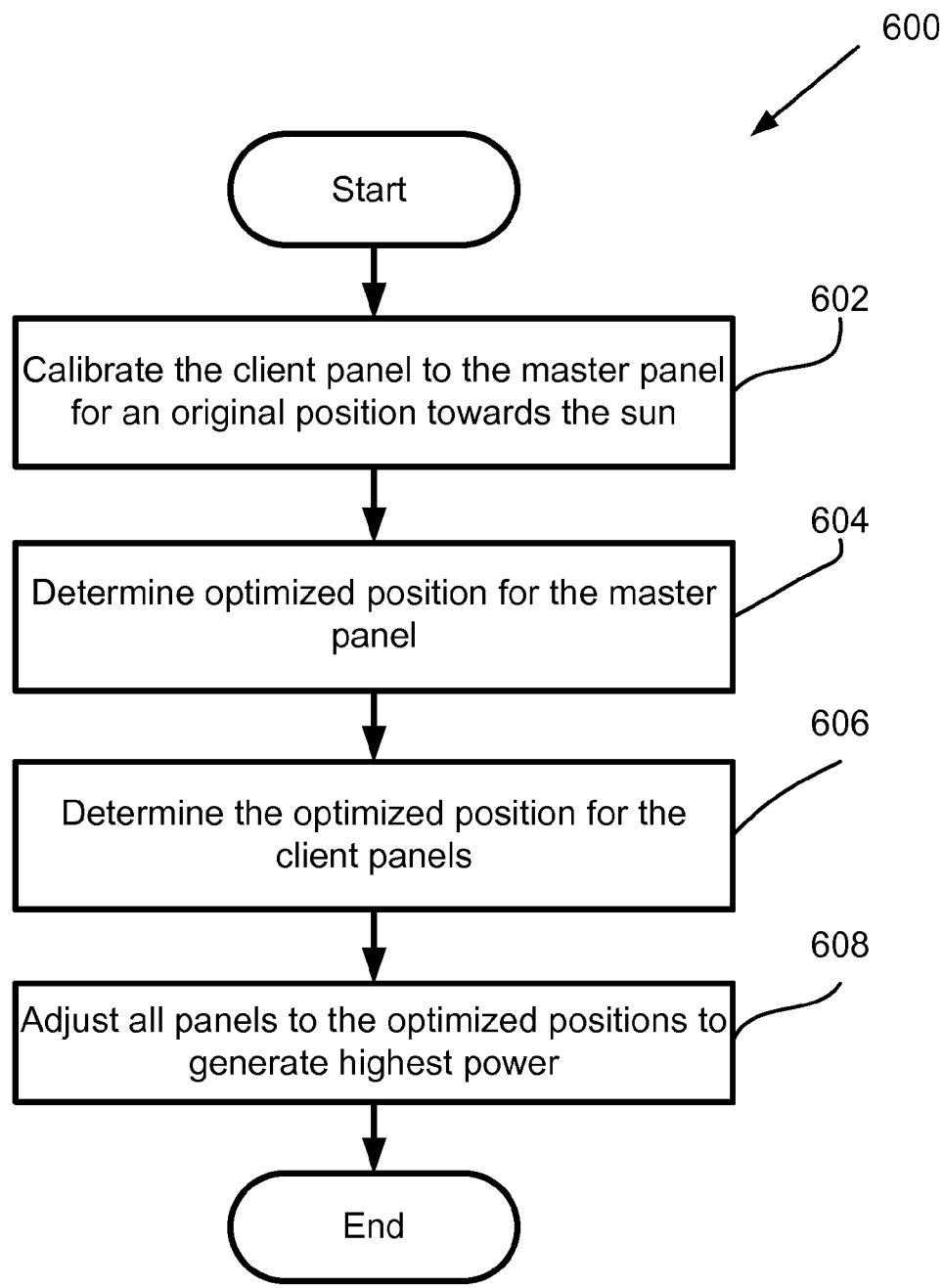
FIG. 6 is a flow diagram depicting steps of operations that optimized positions for all panels in the array are determined.

FIG. 6 is a flow diagram depicting steps of operations that optimized positions for all panels in the array are determined by the use of the ad hoc communication network formed by the communication units 210/224. Process 600 starts with step 602 that each client panel 104 is calibrated to the master panel 102. The calibration process will ensure that when the optimized position for the master panel 102 is determined, the position for each client panel 104 can be derived accurately from the received data file including the optimized position for the master panel 102 even though there may be a mismatch due to the impaction from such as for example, the installation work. The optimized position for the master panel 102 at a particular time of the day is determined in step 604 by employing the operation as depicted in the process 500. The optimized position for each client panel 104 is subsequently determined in step 606 based upon the received optimized position for the master panel 102. The data file may also include the calibration data if it is stored in the memory of the controller 208. The calibration data may also be stored locally in the controller 222 of the client panel 104. All panels are then adjusted to the optimized positions in step 608 by pivoting and/or tilting the panel using the drive mechanism.

Figure 7:
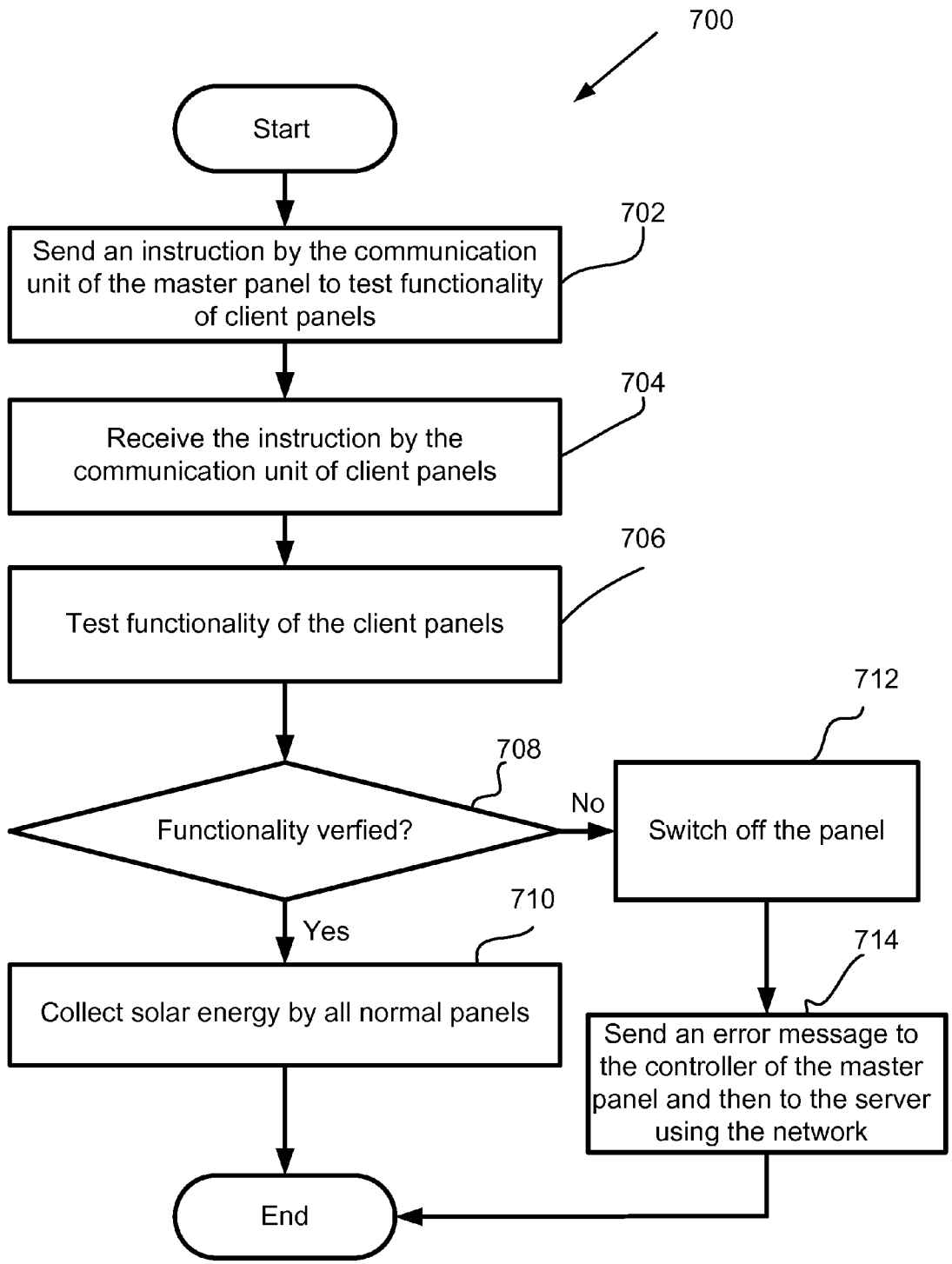
FIG. 7 is a flow diagram depicting steps of operations that functionality of panels are tested and are communicated to the server in the communication network.

FIG. 7 is a flow diagram depicting steps of operations that functionality of panels is tested and communicated to the server 302 connected to the communication network 304. Process 700 starts with step 702 that an instruction for testing functionality is sent out from the communication unit 210 of the master panel 102 through the ad hoc communication network. In step 704, the instruction is received by the communication unit 224 of each client unit 104. The controller 222 in 104 controls an operation of testing functionality in step 706. The testing may be a simple operation of measuring of the output current and voltage of the panel. The testing may involve more completed tasks as instructed by the server 302 through the master panel 102. If the functionality is verified as normal in step 708, the operation of converting solar energy into the electricity will be started or be continued in step 710. If the functionality test fails in step 710, the fault panel may be switched off in step 712 and an error message is sent to the controller 208 through 224/210. The error messages may be further sent to the server 302 through the communication unit 212 and the network 304. A data file indicating the normality of the client panels may also be sent to the master panel 102 and to the server 302 in a similar manner. The operational status of the mater panel 102 may also be collected and be sent to the server 302 through the network 304.

While the invention has been disclosed with respect to a limited number of embodiments, numerous modifications and variations will be appreciated by those skilled in the art. It is intended that all such variations and modifications fall within the scope of the following claims.

The invention claimed is:

1. A solar energy collection system comprising:
   (a) one master panel comprising a plurality of solar energy collection modules, a supporting, pivoting and tilting mechanism, a controller, a first communication unit, a second communication unit, and a means of determining the optimized position towards the sun for generating highest electrical power;
   (b) at least one client panel comprising a plurality of solar energy collection modules, a supporting, pivoting and tilting mechanism, a controller, a communication unit, and a means of determining the optimized position towards the sun for generating highest electrical power based on a received data file including the optimized position for said master panel through a communication means provided by the communication units.

2. The system as recited in claim 1, wherein said means of determining the optimized position of the master panel comprising:
   (a) a means of pivoting and/or tilting the master panel to a plurality of predetermined positions;
   (b) a means of measuring the maximum generated power at each position by a measurement unit; and
   (c) a means of deriving the optimized position from all measured data based upon a predetermined algorithm.

3. The system as recited in claim 2, wherein said predetermined algorithm including:
   (a) determining the optimized position by comparing maximum power at each position and selecting the position corresponding to the highest power generation; and
   (b) determining the optimized position by an algorithm of extrapolating the optimized position from all measured data.

4. The system as recited in claim 1, wherein said means of determining the optimized position of the client panel further including a means of deriving the position from the optimized position of the master panel and from a calibration file reflecting at least installation mismatch among the client panel and the master panel.

5. The system as recited in claim 1, wherein the first communication unit of the master panel further comprising a transceiver conforming to a standard or a combination of standards from the following group:
   (a) ZigBee (IEEE 802.15.4 and its amendments);
   (b) Bluetooth (IEEE 802.11b and its amendments); and
   (c) WiFi (IEEE 802.11 and its amendments).

6. The system as recited in claim 1, wherein said communication unit of said client panel further comprising a transceiver conforming to the same communication standard as the first communication unit of said master panel.

7. The system as recited in claim 1, wherein said second communication unit of said master panel further comprising a transceiver for communicating with an existing communication network including the Internet.

8. The system as recited in claim 1, wherein said mater panel and said client panel further comprising a power supply including a battery.

9. The system as recited in claim 8, wherein said power supply further comprising at least a portion of said solar energy collection modules.

* * * * *